US009693028B2

(12) United States Patent
Fuchikami et al.

(10) Patent No.: US 9,693,028 B2
(45) Date of Patent: Jun. 27, 2017

(54) PROJECTION SYSTEM, SEMICONDUCTOR INTEGRATED CIRCUIT, AND IMAGE CORRECTION METHOD

(71) Applicant: PANASONIC INTELLECTUAL PROPERTY CORPORATION OF AMERICA, Torrance, CA (US)

(72) Inventors: Ryuji Fuchikami, Fukuoka (JP); Masahiro Ohashi, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/345,613

(22) Filed: Nov. 8, 2016

(65) Prior Publication Data
US 2017/0078631 A1 Mar. 16, 2017

Related U.S. Application Data

(63) Continuation of application No. 14/821,659, filed on Aug. 7, 2015, now Pat. No. 9,524,578, which is a
(Continued)

(30) Foreign Application Priority Data

Feb. 18, 2014 (JP) .................................. 2014-028441
Oct. 31, 2014 (JP) .................................. 2014-222824

(51) Int. Cl.
*H04N 5/225* (2006.01)
*H04N 9/31* (2006.01)
(Continued)

(52) U.S. Cl.
CPC .......... *H04N 9/3185* (2013.01); *G06T 15/08* (2013.01); *G06T 15/20* (2013.01); *G06T 17/00* (2013.01);
(Continued)

(58) Field of Classification Search
None
See application file for complete search history.

(56) References Cited

U.S. PATENT DOCUMENTS 6,709,116 B1  3/2004  Raskar et al.
8,195,006 B2  6/2012  Klemmer et al.
(Continued)

FOREIGN PATENT DOCUMENTS

| JP | 2007-309660 | 11/2007 |
| JP | 2013-192189 | 9/2013 |
| WO | 2010/055625 | 5/2010 |

OTHER PUBLICATIONS

The Extended European Search Report dated Feb. 1, 2017 for European Patent Application No. 15745354.9.
(Continued)

Primary Examiner — Twyler Haskins
Assistant Examiner — Dwight C Tejano
(74) Attorney, Agent, or Firm — Greenblum & Bernstein, P.L.C.

(57) ABSTRACT

A projection apparatus projects pattern light onto an object, the pattern light including pattern images corresponding to information that indicates coded projection coordinates in a projection coordinate system. Each of the pattern images includes two or more continuous areas. Widths of the two or more continuous areas are identical to one another, while lengths of the two or more continuous areas are different. An imaging apparatus captures images created on the object and generates captured images including imaging pixel values at imaging pixel coordinates in an imaging coordinate system. An image correction apparatus generates, based on the captured images, coordinate conversion information that associates the projection coordinates with the imaging pixel
(Continued)

coordinates and corrects a projection image by using the coordinate conversion information.

2 Claims, 13 Drawing Sheets

Related U.S. Application Data continuation of application No. PCT/JP2015/000020, filed on Jan. 7, 2015.

(51) Int. Cl.
| | |
|---|---|
| *G06T 15/20* | (2011.01) |
| *G06T 15/08* | (2011.01) |
| *G06T 17/00* | (2006.01) |
| *H04N 5/232* | (2006.01) |
| *H04N 5/74* | (2006.01) |
| *H04N 5/262* | (2006.01) |

(52) U.S. Cl.
CPC ............. *H04N 5/225* (2013.01); *H04N 5/232* (2013.01); *H04N 5/23229* (2013.01); *H04N 5/2628* (2013.01); *H04N 5/74* (2013.01); *H04N 9/3182* (2013.01); *H04N 9/3194* (2013.01); *G06T 2207/10016* (2013.01); *G06T 2207/10024* (2013.01); *G06T 2207/10028* (2013.01); *G06T 2207/30244* (2013.01)

(56) References Cited

U.S. PATENT DOCUMENTS

| | | |
|---|---|---|
| 2004/0085256 A1* | 5/2004 | Hereld ................ H04N 9/12 345/1.1 |
| 2004/0155965 A1 | 8/2004 | Jaynes et al. |
| 2004/0184013 A1 | 9/2004 | Raskar et al. |
| 2005/0179875 A1 | 8/2005 | Aoyanagi |
| 2009/0067749 A1 | 3/2009 | Schiewe et al. |
| 2009/0245682 A1 | 10/2009 | Imai |
| 2009/0310144 A1 | 12/2009 | Jung et al. |
| 2011/0216051 A1 | 9/2011 | Ishiyama |
| 2014/0028705 A1 | 1/2014 | Furui |
| 2014/0168525 A1 | 6/2014 | Hasegawa et al. |

OTHER PUBLICATIONS

International Search Report of PCT application No. PCT/JP2015/000020 dated Mar. 31, 2015.
Naoki Hashimoto et al., "Non-distorted Image Projection Method for a Multi-Projection Display with a Curved Screen" ITE Journal vol. 58, No. 4, pp. 507-513, 2004 (English Abstract).
Joji Takei et al., "Development of a 3000-fps 3D Imaging System Using a High-Speed Projector" Proceedings of the 2007 JSME Conference on Robotics and Mechatronics, May 10-12, 2007 (English Abstract).
Joji Takei et al., "3000-fps 3-D Shape Measurement Using a High-Speed Camera-Projector System" IEEE RSJ International Conference on Intelligent Robots and Systems, 2007.

* cited by examiner

FIG. 6
(a)
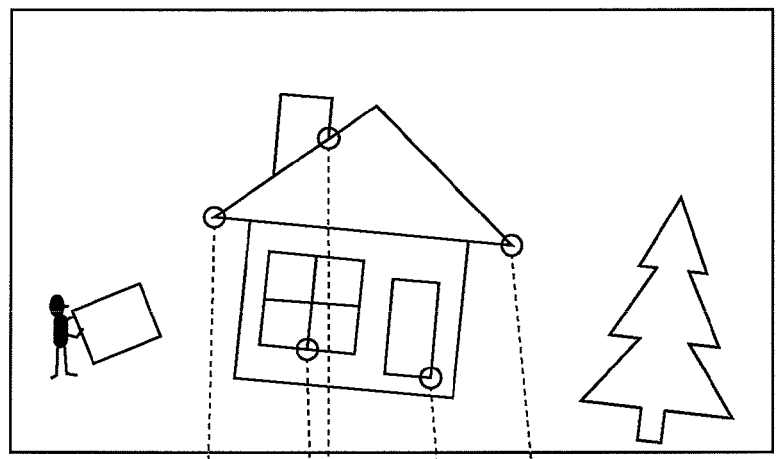
(b)
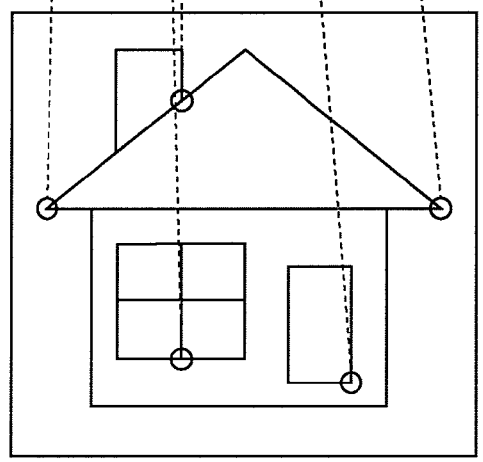

FIG. 7
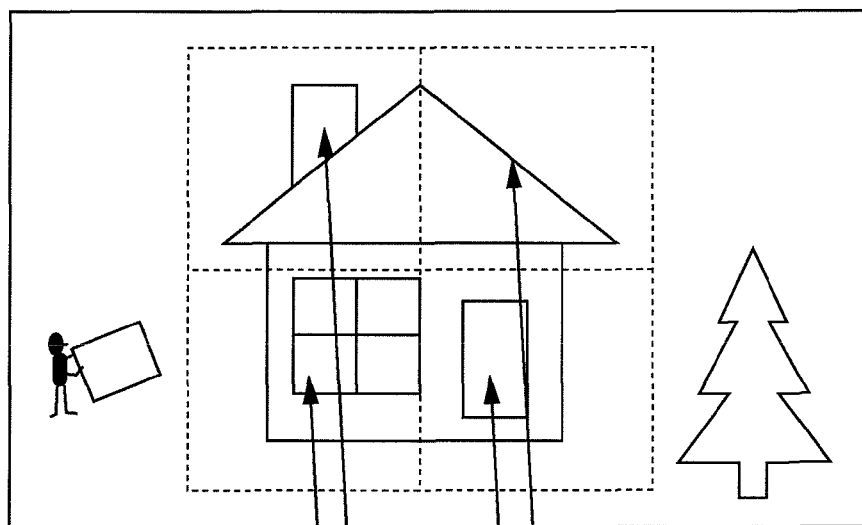
(a)
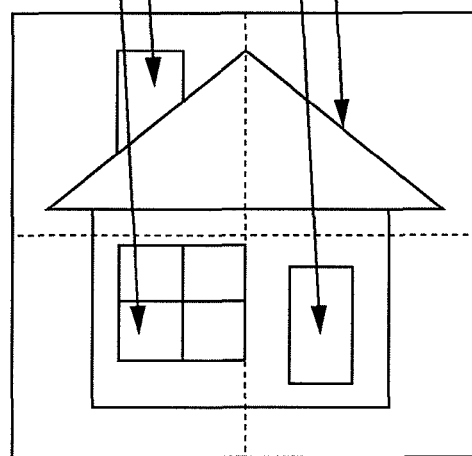
(b)

PROJECTION SYSTEM, SEMICONDUCTOR INTEGRATED CIRCUIT, AND IMAGE CORRECTION METHOD

CROSS REFERENCE TO RELATED APPLICATIONS

This is a continuation application of U.S. patent application Ser. No. 14/821,659, filed Aug. 7, 2015, which is a Continuation of International Application No. PCT/JP2015/000020, filed on Jan. 7, 2015, which claims the benefit of Japanese Patent Application No. 2014-222824, filed on Oct. 31, 2014 and Japanese Patent Application No. 2014-028441, filed on Feb. 18, 2014. The entire disclosure of each of the above-identified applications, including the specification, drawings, and claims, is incorporated herein by reference in its entirety.

BACKGROUND

1. Technical Field

The present disclosure relates to a projection system, a semiconductor integrated circuit, and an image correction method.

2. Description of the Related Art

There is known technology for projecting video content onto objects, for example, structures such as buildings, called projection mapping. Some systems for projection mapping include a system having an imaging function. For example, Japanese Unexamined Patent Application Publication No. 2013-192189 discloses a projection apparatus that adjusts video content on the basis of imaging data.

A further improvement in technique for high-accuracy matching of video content to a projection target has been demanded for the projection apparatus of the related art described above.

SUMMARY

One non-limiting and exemplary embodiment provides a projection system which enables high-accuracy matching of video content to a structure that is a projection target.

In one general aspect, the techniques disclosed here feature a projection system includes a projection apparatus that projects pattern light onto an object, the pattern light including pattern images corresponding to information that indicates coded projection coordinates in a projection coordinate system, an imaging apparatus that captures images created on the object by projecting the pattern light onto the object and that generates first captured images including imaging pixel values at imaging pixel coordinates in an imaging coordinate system, and an image correction apparatus that generates, based on the first captured images, first coordinate conversion information which associates the projection coordinates with the imaging pixel coordinates and that corrects a projection image, which is prepared in advance, by using the first coordinate conversion information.

It should be noted that general or specific embodiments may be implemented as a system, a method, an integrated circuit, a computer program, or a computer-readable recording medium, or may be implemented as any combination of an apparatus, a system, a method, an integrated circuit, a computer program, and a computer-readable recording medium. The computer-readable recording medium includes a non-volatile recording medium such as a compact disc-read only memory (CD-ROM).

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 illustrates conceptual diagrams to explain the association between images according to a scheme using local features;

FIG. 7 illustrates conceptual diagrams to explain the association between images according to a phase-only correlation method;

DETAILED DESCRIPTION

Figure 13:
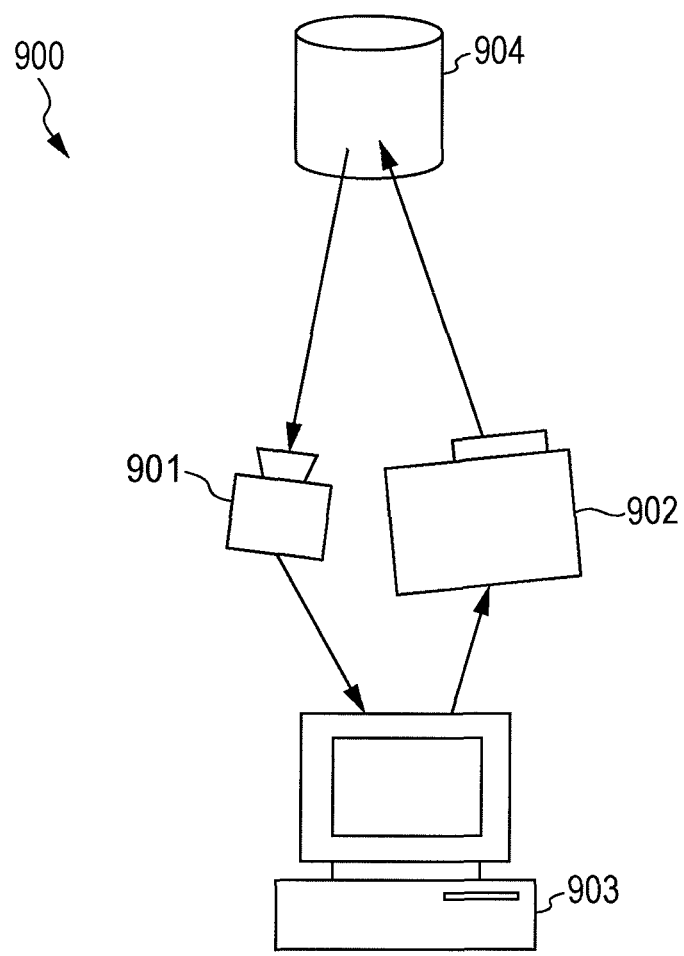
FIG. 13 is a projection system configuration diagram to explain a technique of the related art.

Prior to the description of embodiments of the present disclosure, a description will be made of a projection system 900 of the related art with reference to FIG. 13.

The projection system 900 includes an imaging apparatus 901, a projection apparatus 902, and a calculation apparatus 903. The calculation apparatus 903 performs image recognition of a projection target 904 from an imaging result obtained by the imaging apparatus 901. The calculation apparatus 903 generates video content so that the video content can be projected onto an area where the projection target 904 has been recognized. The projection apparatus 902 projects the video content onto the projection target 904.

In the field of measurement, for example, systems disclosed in Japanese Patent No. 4917351 and "Development of a 3,000-fps 3D Imaging System Using a High-Speed Projector", Proceedings of Robotics and Mechatronics Conference 2007, "1P1-M02(1)"-"1P1-M02(4)", May 11, 2007 (hereinafter referred to as the "non-patent literature") are known in addition to that disclosed in Japanese Unexamined Patent Application Publication No. 2013-192189. The non-patent literature described above discloses a method for high-speed measurement of 3D shapes using light pattern projection. The system configuration in the non-patent literature described above is also considered to be substantially identical to the system configuration illustrated in FIG. 13. In the system in the non-patent literature described above, the imaging apparatus 901 has a high-speed image capturing function. The projection apparatus 902 is also implemented as a device capable of outputting a high-speed binary image using a digital micromirror device. For example, the imaging apparatus 901 can perform high-speed image capture at 6000 fps. The projection apparatus 902 can project a binary pattern having 1024×768 pixels at 6000 fps or more.

Specifically, a pattern obtained by Manchester encoding of bits representing gray-coded X coordinates of 1024×768 images is set in a digital micromirror device at 6000 fps. This pattern is projected onto the projection target 904, and the imaging apparatus 901 captures an image of the projection target 904, onto which the pattern has been projected, at 6000 fps.

Since the X coordinates are in the range of 0 to 1023, each coordinate is represented by 10 bits. Further, as a result of Manchester encoding, each coordinate is represented by 20 bits. Thus, respective X coordinates are obtained from captured images of 20 frames. In addition, the distance to the projection target 904 can be obtained for each pixel using trigonometry. The result of image capture is transmitted to the calculation apparatus (for example, personal computer) 903 and is analyzed. Manchester encoding enables a new X coordinate bit to be obtained every two frames for re-calculation. Accordingly, 3D measurement with a resolution of 3000 fps as a final throughput is made possible.

Japanese Patent No. 4917351 discloses a technique in which, while a Gray code (checkerboard) representing a binary pattern is projected, an image of the projected Gray code is captured using a camera to correct a distortion of an image projected onto a screen. In the disclosed technique, a combination of a plurality of checkerboards can further improve correction accuracy with a camera distortion taken into account.

In the following, issues of the related art to be addressed by the present disclosure will be described.

In consideration of projection of video content onto a structure serving as a projection target, such as projection mapping, there is a demand for positional adjustment of the video content with respect to the structure as intended before the projection. In this case, controlling a projection range of the video content by using data obtained by an imaging apparatus can be achieved by a person skilled in the art on the basis of the technique of the related art described above; however, two large issues in suppression of an error in the projection range remain to be overcome.

The first issue is that there is inconsistency between the arrangement of a projection apparatus which is anticipated when video content is created and the actual arrangement of the projection apparatus. The design of video content for projection mapping is based on, for example, a photograph of an actual structure, design data during construction, and the like. However, it is very difficult to place the projection apparatus at precisely the same position and angle of view as those anticipated beforehand, and there may be an error in the anticipated range. Such an error may be adjusted by hand. However, re-adjustment may be required due to external factors such as rearrangement and fine vibrations, and thus adjustment by hand seems less beneficial.

The second issue is that, even if an imaging apparatus is used to attempt automatic adjustment, extremely sophisticated adjustment is forcibly used in the positional relationship between the imaging apparatus and the projection apparatus so as to enable the imaging apparatus to perform precise measurement of the structure. Additionally, the position and angle of view of the imaging apparatus are different from those of the projection apparatus, and, in addition, the structure has a complex form in the depth direction rather than in plan view. This requires sophisticated measurement accompanied by three-dimensional measurement, and geometric transformations. A failure to obtain precise measurement results in a measurement error appearing as a positional displacement during projection.

The correction technique disclosed in Japanese Patent No. 4917351 assumes that the projection target is a screen. Accordingly, the technique of the related art is not applicable for use in extracting the features of a structure having a complex form and mapping projection to feature positions. An overview of aspects of the present disclosure is as follows.

A projection system according to an aspect of the present disclosure includes a projection apparatus that projects pattern light onto an object, the pattern light including pattern images corresponding to information that indicates coded projection coordinates in a projection coordinate system, an imaging apparatus that captures images created on the object by projecting the pattern light onto the object and that generates first captured images including imaging pixel values at imaging pixel coordinates in an imaging coordinate system, and an image correction apparatus that generates, based on the first captured images, first coordinate conversion information which associates the projection coordinates with the imaging pixel coordinates and that corrects a projection image, which is prepared in advance, by using the first coordinate conversion information.

This configuration enables a projection image prepared in advance to be automatically corrected so as to achieve high-accuracy matching of the projection image to an object that is a projection target.

In an aspect, the image correction apparatus may compare a second captured image indicating a structure of the object, which is obtained by the imaging apparatus, with a reference image prepared in advance, generate second coordinate conversion information which associates the second captured image with the reference image by using a geometric transformation, and perform a geometric transformation process on the projection image by using the first coordinate conversion information and the second coordinate conversion information.

This configuration enables a projection image prepared in advance to be automatically corrected so as to achieve higher-accuracy matching of the projection image to an object that is a projection target.

In an aspect, the image correction apparatus may limit, within a whole range of the second captured image, an image range to be used for association between the second captured image and the reference image based on a geometric transformation, by pattern matching using the reference image.

This configuration enables the second coordinate conversion information to be generated with higher accuracy.

In an aspect, the image correction apparatus may perform a geometric transformation process on a second captured image indicating a structure of the object, which is obtained by the imaging apparatus, by using the first coordinate conversion information, and generate a viewpoint-converted image.

This configuration enables an image viewed from the viewpoint of the projection apparatus (viewpoint-converted image) to be generated using an image obtained by an imaging apparatus installed at a position different from that of the projection apparatus.

In an aspect, the image correction apparatus may include an output unit that outputs the viewpoint-converted image to outside.

This configuration enables the viewpoint-converted image to be extracted to the outside.

In an aspect, the image correction apparatus may compare the viewpoint-converted image with a reference image prepared in advance, generate third coordinate conversion information which associates the viewpoint-converted image with the reference image by using a geometric transformation, and perform a geometric transformation process on the projection image by using the third coordinate conversion information.

This configuration enables a captured image which has been obtained by the imaging apparatus to be directly converted into an image in a projection coordinate system, enabling an improvement in robustness of image matching to the projection image.

In an aspect, the projection image may include a first projection image and a second projection image, the first projection image and the second projection image being different from each other, and the image correction apparatus may select one projection image from among the first projection image and the second projection image on the basis of three-dimensional measurement information obtained from the imaging apparatus and on the basis of the first coordinate conversion information, and correct the selected projection image.

This configuration enables high-accuracy matching of the projection image to an object that is a projection target in accordance with the distance to the object.

In an aspect, the three-dimensional measurement information may be information on a distance to the object, which is obtained from the first coordinate conversion information by trigonometry, and the image correction apparatus may select one projection image from among the first projection image and the second projection image in accordance with the information on the distance to the object, and correct the selected projection image on the basis of the first coordinate conversion information.

This configuration can provide a verity of image correction apparatuses that correct a projection image on the basis of three-dimensional measurement information. Since measurement can be performed in the projection coordinate system of the projection apparatus, a corrected projection image can be generated without a pixel shift.

In an aspect, the three-dimensional measurement information may be information on a normal vector to a surface of the object, which is obtained by photometric stereo, and the image correction apparatus may select one projection image from among the first projection image and the second projection image in accordance with a vector direction indicated by the information on the normal vector, and correct the selected projection image on the basis of the first coordinate conversion information.

This configuration can provide a variety of image correction apparatuses that correct a projection image on the basis of three-dimensional measurement information. High-accuracy detection of a normal vector is achievable by software without any additional new light source.

In an aspect, the imaging apparatus may include an image sensor that performs distance measurement based on a period of time until light emitted from a light source is reflected by the object and reaches the imaging apparatus, and the image correction apparatus may select one projection image from among the first and second projection images on the basis of information on a distance to the object, which is obtained by the distance measurement, and correct the selected projection image on the basis of the first coordinate conversion information.

This configuration can provide a variety of image correction apparatuses that correct a projection image on the basis of three-dimensional measurement information. It is also possible to simultaneously perform distance measurement and video acquisition.

The projection apparatus may project a corrected projection image onto the object.

A semiconductor integrated circuit according to an aspect of the present disclosure is a semiconductor integrated circuit for use in a projection system, the projection system including a projection apparatus that projects pattern light onto an object, the pattern light including pattern images corresponding to information that indicates coded projection coordinates in a projection coordinate system, and an imaging apparatus that captures images created on the object by projecting the pattern light onto the object and that generates first captured images including imaging pixel values at imaging pixel coordinates in an imaging coordinate system. The semiconductor integrated circuit includes a projection coordinate conversion information generation unit that generates, based on the first captured images, first coordinate conversion information which associates the projection coordinates with the imaging pixel coordinates, and a projection image data conversion unit that corrects a projection image, which is prepared in advance, by using the first coordinate conversion information.

The semiconductor integrated circuit described above enables high-accuracy matching of a projection image to an object that is a projection target in a projection system.

An image correction method according to an aspect of the present disclosure includes projecting pattern light onto an object, the pattern light including pattern images corresponding to information that indicates coded projection coordinates in a projection coordinate system; capturing images created on the object by projecting the pattern light onto the object and generating first captured images including imaging pixel values at imaging pixel coordinates in an imaging coordinate system; generating, based on the first captured images, first coordinate conversion information which associates the projection coordinates with the imaging pixel coordinates; and correcting a projection image, which is prepared in advance, by using the first coordinate conversion information.

The method described above enables high-accuracy matching of a projection image to an object that is a projection target in a projection system.

The configurations described above and a system configuration having a combination of the configurations enable video projection and measurement to be performed by the same projector, which can theoretically suppress the occurrence of a mismatch between projection and measurement. In addition, superposition of geometric measurement outcomes without interference with video of visible light is achievable.

Specific embodiments of the present disclosure will be described hereinafter with reference to the drawings. In the following description, the same or similar constituent elements are assigned the same reference numerals. Further, a redundant description may be omitted. A projection system according to an embodiment of the present disclosure is not limited to those illustrated in the following examples.

First Embodiment

The structure and function of a projection system 100 according to this embodiment will be described with reference to FIG. 1 to FIG. 8.

Figure 1:
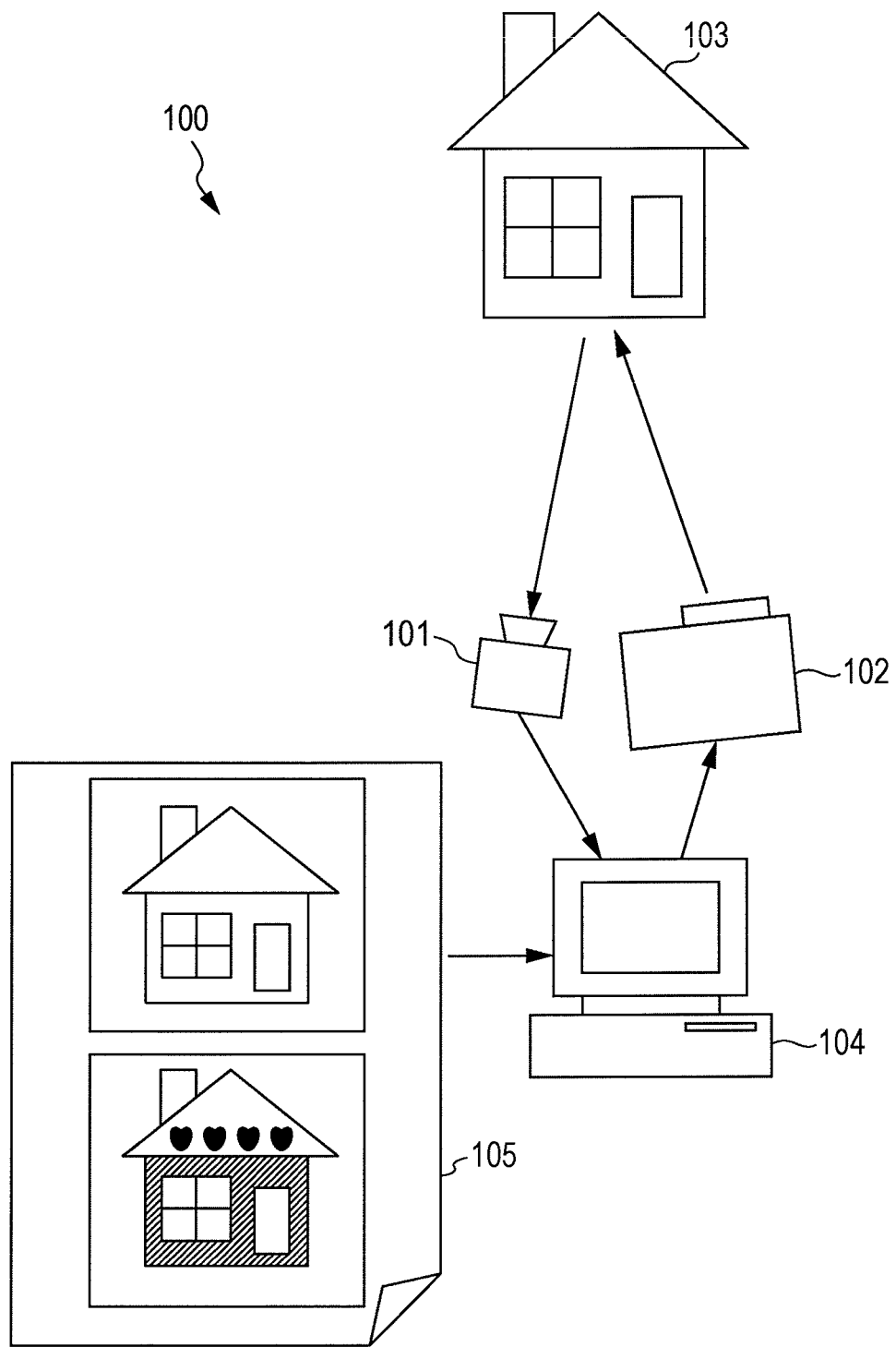
FIG. 1 is a schematic diagram illustrating a schematic configuration of a projection system according to a first exemplary embodiment.

FIG. 1 schematically illustrates a schematic configuration of the projection system 100. The projection system 100 includes an imaging apparatus 101, a projection apparatus 102, and an image correction apparatus 104.

The projection apparatus 102 projects, onto a structure 103, pattern light indicating a pattern image corresponding to information that indicates coded projection coordinates defined in a projection coordinate system. The projection apparatus 102 includes a light source, a lens optical system, and so forth. In this specification, the projection coordinate system refers to a coordinate system that identifies coordinates of each pixel in an image of video content 105, which is a projection image. Coordinates that identify each pixel in the image of the video content 105 are referred to as "projection coordinates" in the projection coordinate system.

The imaging apparatus 101 captures an image of the pattern light, and generates the captured image of the pattern light (first captured image). The imaging apparatus 101 includes an image sensor, a lens optical system, and so forth. The image correction apparatus 104 is configured to generate, based on the captured image of the pattern light, first coordinate conversion information which associates projection coordinates with imaging pixel coordinates defined in an imaging coordinate system of the imaging apparatus 101, and to correct the video content 105 by using the first coordinate conversion information. In this specification, the imaging coordinate system refers to a coordinate system that identifies coordinates of each pixel in a captured image obtained by the imaging apparatus 101. Coordinates of each pixel in a captured image are referred to as "imaging coordinates" in the imaging coordinate system in order to distinguish them from the "projection coordinates".

Figure 2:
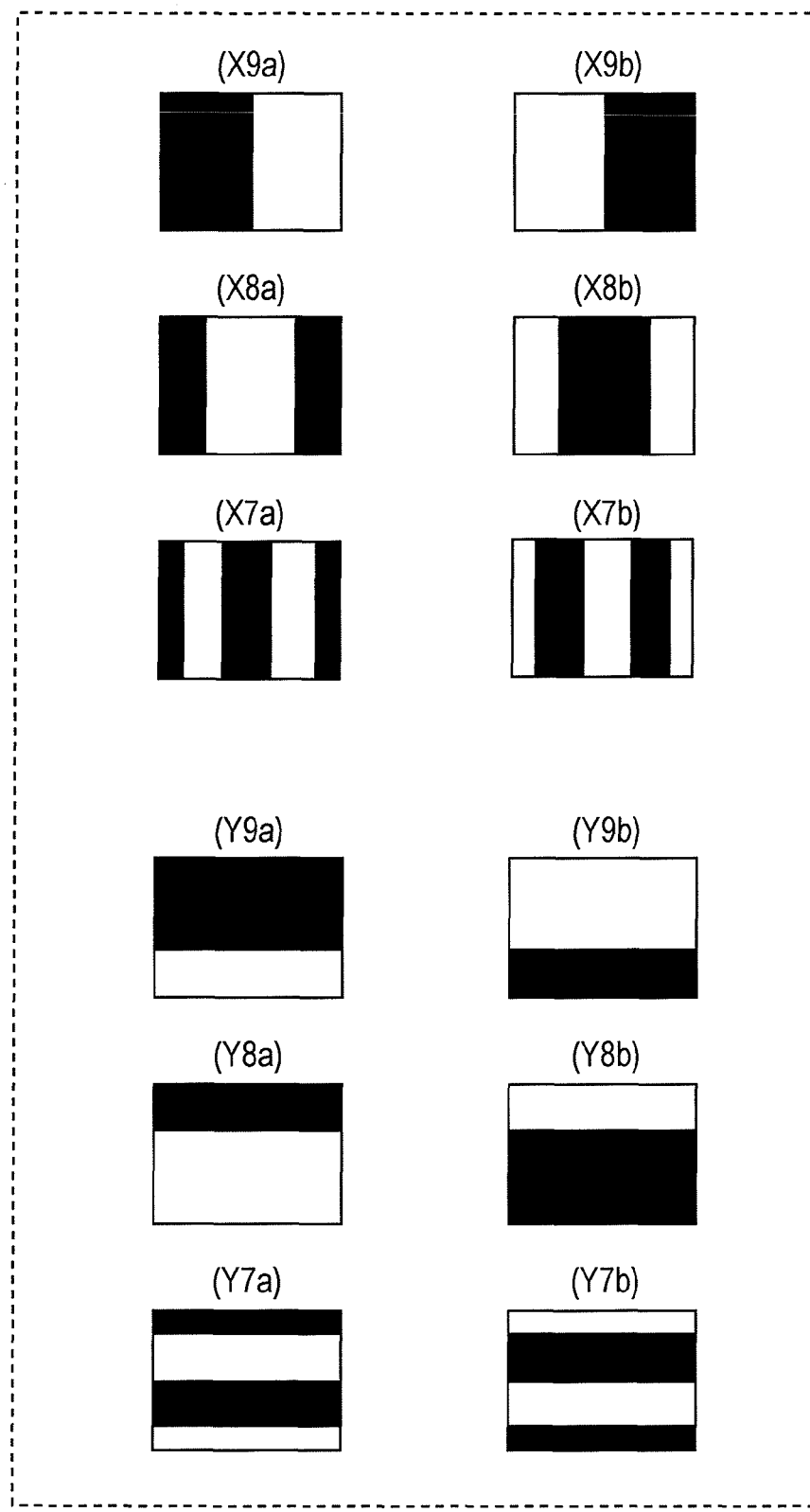
FIG. 2 is an image diagram illustrating twelve typical pattern images included in forty pattern images in an example where XGA coordinates are converted to codes using the forty pattern images.

FIG. 2 illustrates an image diagram illustrating twelve typical pattern images included in forty pattern images in an example where XGA coordinates are converted to codes using the forty pattern images. The projection apparatus 102 can project pattern light onto the structure 103 on the basis of, for example, a pattern image of 1024×768 pixels. The X coordinate and Y coordinate of each of the pixels are both greater than 512 and less than or equal to 1024. In this case, 10 bits, starting from bit 0 to bit 9, representing the X coordinate are converted to Gray codes. Similarly to the X coordinate, 10 bits, starting from bit 0 to bit 9, representing the Y coordinate are converted to Gray codes. In the manner described above, 10 bits are assigned to each coordinate; 20 bits in total are assigned, enabling coordinate information to be converted to codes. In the following, a description will be made of an example of encoding the 20-bit information by using image data of forty frames.

In FIG. 2, (X9a) illustrates a pattern image corresponding to bit 9 after the X coordinate has been converted to Gray codes. In this embodiment, since the projection coordinates are encoded using Manchester encoding, an inverted pattern image obtained as a result of subjecting bit 9 to bit inversion is also used. In FIG. 2, (X9b) illustrates an inverted pattern image obtained as a result of inverting the image pattern in (X9a). Also, in FIG. 2, (X8a) illustrates a pattern image corresponding to bit 8 after the X coordinate has been converted to Gray codes, and (X8b) illustrates an inverted pattern image obtained as a result of inverting the image pattern in (X8a). In FIG. 2, (X7a) illustrates a pattern image corresponding to bit 7 after the X coordinate has been converted to Gray codes, and (X7b) illustrates an inverted pattern image obtained as a result of inverting the image pattern in (X7a).

In FIG. 2, (Y9a) illustrates a pattern image corresponding to bit 9 after the Y coordinate has been converted to Gray codes. In FIG. 2, (Y9b) illustrates an inverted pattern image obtained as a result of inverting the image pattern in (Y9a). Also, in FIG. 2, (Y8a) illustrates a pattern image corresponding to bit 8 after the Y coordinate has been converted to Gray codes, and (Y8b) illustrates an inverted pattern image obtained as a result of inverting the image pattern in (Y8a). In FIG. 2, (Y7a) illustrates a pattern image corresponding to bit 7 after the Y coordinate has been converted to Gray codes, and (Y7b) illustrates an inverted pattern image obtained as a result of inverting the image pattern in (Y7a).

Although not illustrated in the drawings, forty pattern images including pattern images respectively corresponding to bits 6 to 0 of the X coordinate and Y coordinate and images obtained as a result of inverting the pattern images are sequentially projected onto the structure 103 by the projection apparatus 102. The imaging apparatus 101 captures an image of pattern light projected onto the structure 103, and sequentially generates forty pattern images (the pattern light includes the forty pattern images).

Next, the details of the structure, function, and operation of the image correction apparatus 104 will be described with reference to FIGS. 3 and 4.

Figure 3:
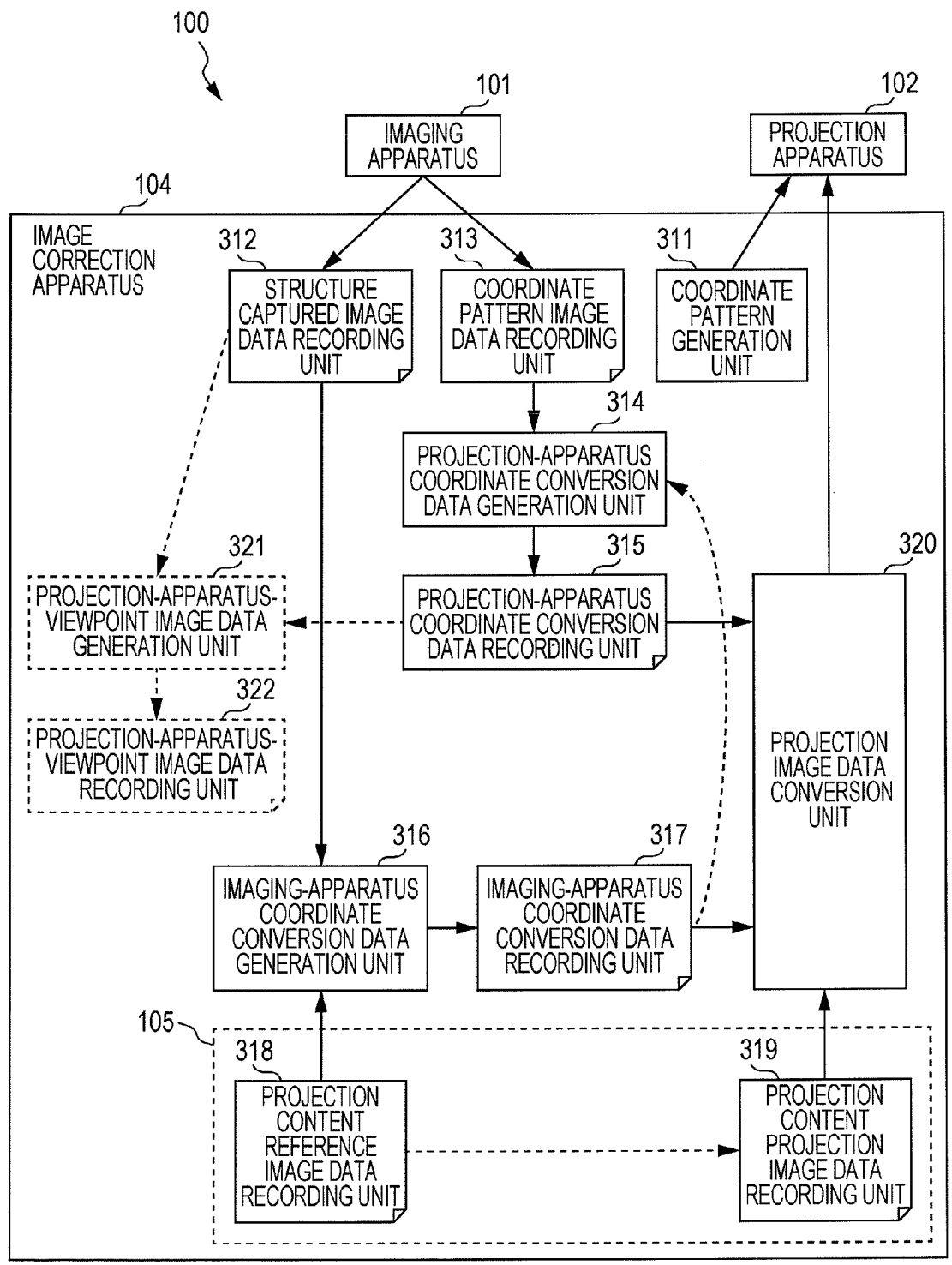
FIG. 3 is a functional block configuration diagram of an image correction apparatus according to the first exemplary embodiment.

FIG. 3 illustrates an example of a functional block configuration of the image correction apparatus 104. The image correction apparatus 104 has a function of controlling the entire projection system. The image correction apparatus 104 may be implemented by, for example, a computer, an arithmetic device such as a processor, or a semiconductor integrated circuit. Examples of the semiconductor integrated circuit include an application specific integrated circuit (ASIC) and a field programmable gate array (FPGA). A computer program for implementing the functions of the individual constituent elements is stored in a memory. A processor in a semiconductor integrated circuit may execute the computer program in sequence, thereby implementing the functions of the individual constituent elements.

The image correction apparatus 104 includes a coordinate pattern generation unit 311, a structure captured image data recording unit 312, a coordinate pattern image data recording unit 313, a projection-apparatus coordinate conversion data generation unit 314, a projection-apparatus coordinate conversion data recording unit 315, an imaging-apparatus coordinate conversion data generation unit 316, an imaging-apparatus coordinate conversion data recording unit 317, a projection content reference image data recording unit 318, a projection content projection image data recording unit 319, and a projection image data conversion unit 320. The image correction apparatus 104 corrects a projection image prepared in advance. In the following, a projection image which has been corrected may be referred to as a "corrected projection image" in order to distinguish it from the projection image prepared in advance before correction.

Figure 4:
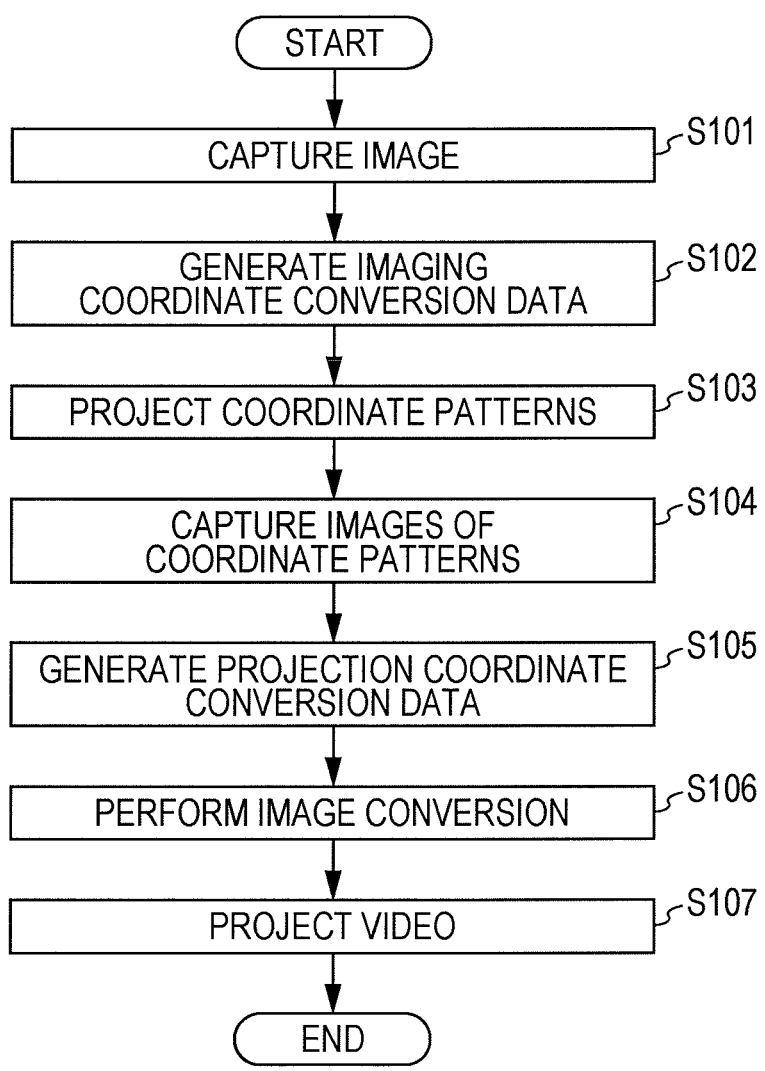
FIG. 4 is a flowchart of an image correction method according to the first exemplary embodiment.

FIG. 4 illustrates a flowchart of an image correction method according to this embodiment.

Step S101

First, the imaging apparatus 101 captures an image of the structure 103. The image correction apparatus 104 records the captured image of the structure 103 (second captured image) on the structure captured image data recording unit 312. During the imaging operation, the projection apparatus 102 can project video whose entire frame is white instead of illumination. In this embodiment, each data recording unit in the image correction apparatus 104 serves as, for example, a memory in the image correction apparatus 104.

Step S102

An image comparison process is performed on the captured image obtained in step S101 and a reference image prepared in advance. As a result, second coordinate conversion information for associating the images with each other using a geometric transformation is obtained. The reference image refers to an image to be referred to for designing video content.

The projection content reference image data recording unit 318 has recorded thereon a reference image prepared in advance for creating video content. The imaging-apparatus coordinate conversion data generation unit 316 compares the reference image with the captured image recorded on the structure captured image data recording unit 312 to generate second coordinate conversion information. The second coordinate conversion information is information which associates the captured image with the reference image using a geometric transformation.

The second coordinate conversion information is recorded on the imaging-apparatus coordinate conversion data recording unit 317. Alternatively, the imaging-apparatus coordinate conversion data generation unit 316 may use an image recorded on the projection content projection image data recording unit 319, instead of the reference image, depending on the type of the video content. The projection content projection image data recording unit 319 has recorded thereon in advance a projection image as video content for projection before correction.

Figure 5A:
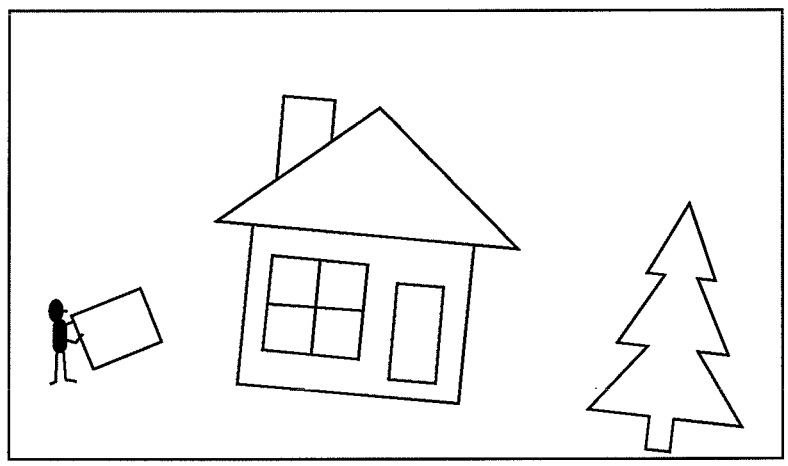
FIG. 5A is an image diagram illustrating an example of a captured image of a structure.
Figure 5B:
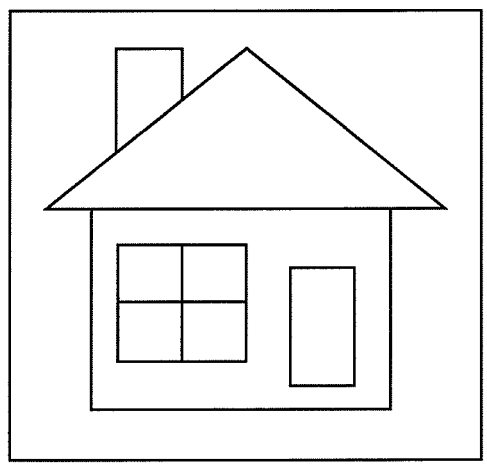
FIG. 5B is an image diagram illustrating an example of a reference image.

FIG. 5A illustrates an example of a captured image of the structure 103, and FIG. 5B illustrates an example of the reference image.

A portion of the captured image illustrated in FIG. 5A corresponds to the reference image illustrated in FIG. 5B. Further, it is found that a positional displacement of the imaging apparatus 101 will cause a failure to match the positions of both images if a geometric transformation such as rotation and/or reduction is not performed. In this case, a well-known method can be widely used to align the positions of the images. In the following, a description will be made of examples of position alignment of images using local features and a phase-only correlation method.

FIG. 6 illustrates conceptual diagrams to explain the association between images according to a scheme using local features. FIG. 6(a) is an image diagram illustrating an example of a captured image of a structure, and FIG. 6(b) is an image diagram illustrating an example of a reference image. Examples of the local features include features less susceptible to rotation, enlargement/reduction, and lighting conditions, such as Scale-Invariant Feature Transform (SIFT) features. In the SIFT algorithm, a local area in an image is divided into 16 blocks using as a reference the direction with the largest luminance change. For each block, luminance changes in eight directions are obtained and are represented as 128-dimensional vectors in total to describe features.

In the example in FIG. 6, first, a region having a large feature is extracted as a candidate keypoint from FIG. 6(b). Then, a portion having the same feature as the feature of the keypoint is searched for from FIG. 6(a) to provide an association between the images. In FIG. 6, five associations (pairs) are illustrated. In actuality, however, more pairs are produced.

By removing errors using a histogram or the like, it is possible to obtain a large number of associations with high accuracy. At the stage where a large number of associations are obtained, a correspondence table serving as a complement to them may be created as second coordinate conversion information. Alternatively, a coordinate transformation matrix of an affine transformation or projection transformation may be determined by using a least square method or the like. In either case, data for converting coordinates from the imaging coordinate system to the projection coordinate system can be obtained.

FIG. 7 illustrates conceptual diagrams to explain the association between images according to a phase-only correlation method. FIG. 7(a) is an image diagram illustrating an example of a captured image of a structure, and FIG. 7(b) is an image diagram illustrating an example of a reference image. For example, the use of a method that uses SIFT features or the like may increase the tendency for erroneous determination to occur during the processing of an image that contains repetitions of the same pattern, such as an image of windows in a building. Thus, any other method such as a phase-only correlation method may be used as well.

For example, a phase-only correlation method involves a Fourier transform of the images to be compared, followed by amplitude normalization, and synthesis of the images using phase information. Thereafter, an inverse Fourier transform results in a correlation of image phase differences being obtained. As an application of the phase-only correlation method, there exists a method, such as the rotation invariant phase-only correlation method, that uses Log-Polar conversion and also enables rotation and/or enlargement/reduction. In the example illustrated in FIG. 7, however, an image obtained in a case where there is no large difference in rotation and enlargement/reduction or in a case where rotation and enlargement/reduction are performed to some extent in advance by pre-processing such as SIFT is illustrated.

First, correlation positions on the entire image in FIG. 7(b), as a target, with respect to FIG. 7(a) are determined using a phase-only correlation method. Then, the image in FIG. 7(a) is divided into four blocks, and the phase range is limited within a certain distance. Then, a correlation position in each block is determined using the phase-only correlation method. As a result, four image associations between corresponding blocks are obtained. Each block may be subdivided into 16 sub-blocks or the like to make hierarchical associations. Such a hierarchical search can suppress an incorrect operation even if an image has a plurality of similar feature points. In addition, the phase-only correlation method facilitates the calculation with sub-pixel accuracy. Thus, the phase-only correlation method is effective in view of more accurate computation of corresponding coordinates.

Additionally, block segmentation improves robustness against partial distortion between a captured image and a reference image.

Reference is again made to FIGS. 3 and 4.

Step S103

The projection apparatus 102 projects, onto an object, pattern light indicating a pattern image corresponding to information that indicates a coded projection coordinate. The coordinate pattern generation unit 311 generates a pattern image corresponding to the information that indicates the coded projection coordinate. For example, as described above, pattern light includes pattern images of a plurality of frames. A projection of the pattern light onto the structure 103 based on a pattern image of 1024×768 pixels using Manchester encoding requires pattern images of forty frames, assuming that one pattern image is included per frame. The projection apparatus 102 sequentially projects the forty pattern images generated by the coordinate pattern generation unit 311 onto the structure 103.

Step S104

The imaging apparatus 101 sequentially captures the pattern images projected onto the structure 103. Data of the pattern images is recorded on the coordinate pattern image data recording unit 313.

Step S105

First coordinate conversion information is obtained from the pattern images in the coordinate pattern image data recording unit 313. The first coordinate conversion information is information which associates imaging coordinates in the imaging apparatus 101 with projection coordinates in the projection apparatus 102.

The projection-apparatus coordinate conversion data generation unit 314 reads a pattern image from the coordinate pattern image data recording unit 313. The projection-apparatus coordinate conversion data generation unit 314 generates, based on the read pattern image, first coordinate conversion information which associates projection coordinates with imaging coordinates. In this case, by taking a difference between a pattern image corresponding to each bit and a pattern image obtained by subjecting the pattern image to bit inversion, it is possible to determine 0 or 1 of each bit regardless of color information of the structure 103. As pixels corresponding to a portion of the structure 103 on which no projection light (pattern light) impinges, pixels for which the difference is small may be excluded from the target for processing. As a result of the image processing of the forty pattern images in the manner described above, projection coordinates in the projection coordinate system corresponding to imaging coordinates in the imaging coordinate system can be obtained.

The association between the pixel coordinates and the projection coordinates may be provided as a conversion table based on the pixel level (luminance value), or may be provided as a coordinate transformation matrix for affine transformation or projection transformation by using a least square method or the like.

An example of the association between pixel coordinates and projection coordinates within a limited image range will be described with reference to FIGS. 8A and 8B.

Figure 8A:
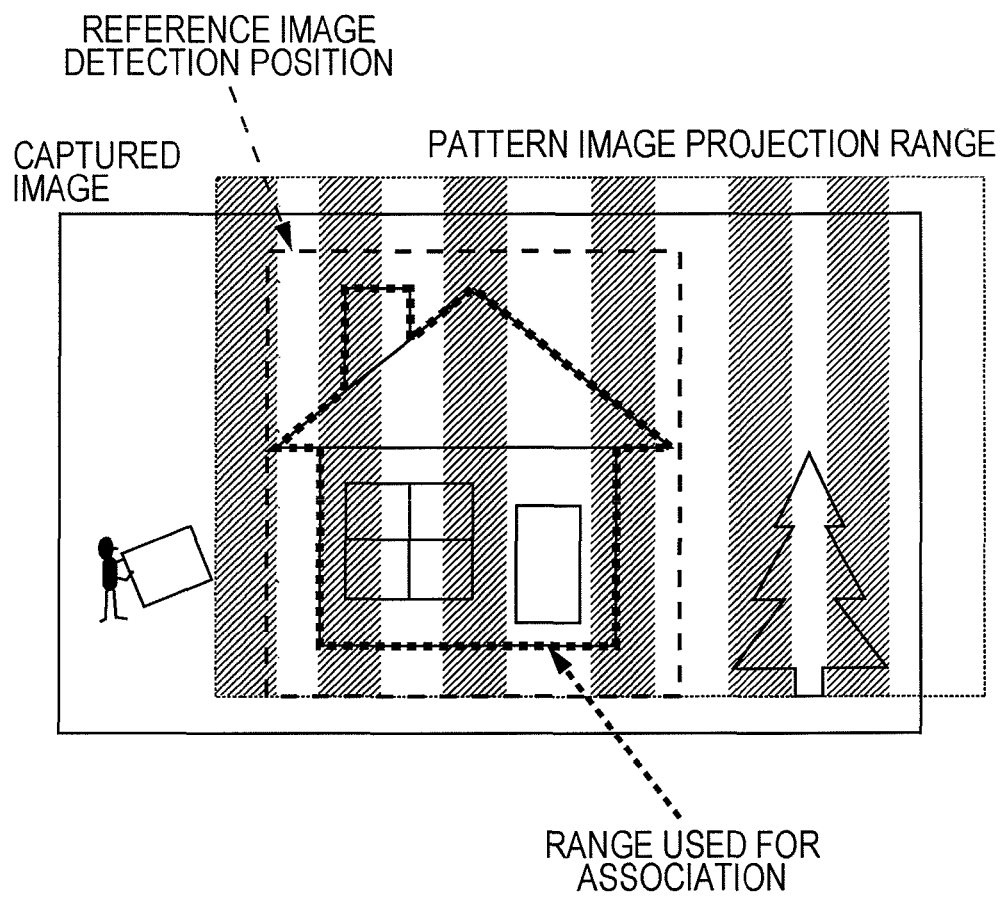
FIG. 8A is a conceptual diagram to explain the association between pixel coordinates and projection coordinates, schematically illustrating positional relationships between a captured image and pattern images projected onto a structure.
Figure 8B:
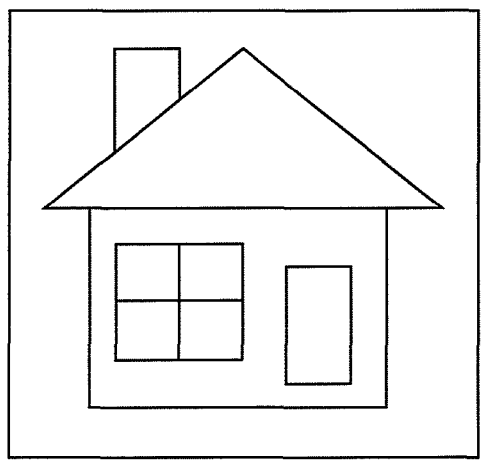
FIG. 8B is a conceptual diagram to explain the association between pixel coordinates and projection coordinates, illustrating an image diagram of a reference image.

FIG. 8A schematically illustrates a positional relationship between a captured image and pattern images projected onto the structure 103. FIG. 8B illustrates an image diagram of a reference image. The projection apparatus 102 projects pattern images onto an entire surface of the structure 103. Within the whole range of a captured image obtained by the imaging apparatus 101, a range used for the association between imaging coordinates and projection coordinates is limited by pattern matching using a reference image. Finally, an image within the limited range of the captured image is compared with the reference image to obtain first coordinate conversion information which associates imaging coordinates with projection coordinates. Since the structure 103 is not generally rectangular, even a portion that is not a projection target may also be included in a projection range. Excluding the range improves the accuracy with which the second coordinate conversion information is generated.

Reference is again made to FIGS. 3 and 4.

Step S106

A geometric transformation process is performed on a projection image prepared in advance by using the first coordinate conversion information and the second coordinate conversion information to generate a corrected projection image. The projection content projection image data recording unit 319 has recorded thereon in advance an image for projection. The projection image data conversion unit 320 reads a projection image from the projection content projection image data recording unit 319. The projection image data conversion unit 320 corrects (performs image conversion on) the projection image by using the first coordinate conversion information and the second coordinate conversion information. In the conversion process, if the first coordinate conversion information and the second coordinate conversion information are given as determinants, the determinants are combined into a determinant which may be used, or both determinants may be used without being combined and the conversion process may be performed twice. In the manner described above, the projection image can be corrected using any well-known method.

Step S107

The projection apparatus 102 projects the corrected projection image, which has been subjected to conversion by the projection image data conversion unit 320, onto the structure 103.

In the manner described above, video content can be projected onto the structure 103 by projection mapping in accordance with the flowchart illustrated in FIG. 4. In the method according to this embodiment, the steps may be reordered as long as there is no inconsistency between data dependencies.

The projection system according to this embodiment includes a single imaging apparatus and a single projection apparatus, for simplicity. However, the present disclosure is not limited thereto, and the use of a plurality of imaging apparatuses and a plurality of projection apparatuses enables more effective correction of a projection image prepared in advance. In particular, an increase in the number of imaging apparatuses that capture the projection destination of a single projection apparatus leads to a reduction in blind spots. For this reason, two or more imaging apparatuses may be used.

Furthermore, some of a plurality of imaging apparatuses may be used for zooming only for a portion (reference portion) to be subjected to position alignment with high accuracy, or may be installed near the structure 103. Not all of the structure 103 may be located within the angle of view of the imaging apparatus 101 if the reference portion for position alignment is maintained to a necessary and sufficient extent.

This embodiment can provide a projection system which enables automatic correction of a projection image prepared in advance so as to achieve high-accuracy matching of the video content to be projected to the actual structure 103.

Second Embodiment

The configuration, function, and operation of an image correction apparatus 104 according to this embodiment will be described with reference to FIG. 9 and FIG. 10.

A projection system 100 according to this embodiment is different from the projection system 100 according to the first embodiment in that a viewpoint-converted image is generated as a by-product. In the following, a description will focus on the difference from the projection system 100 according to the first embodiment.

Figure 9:
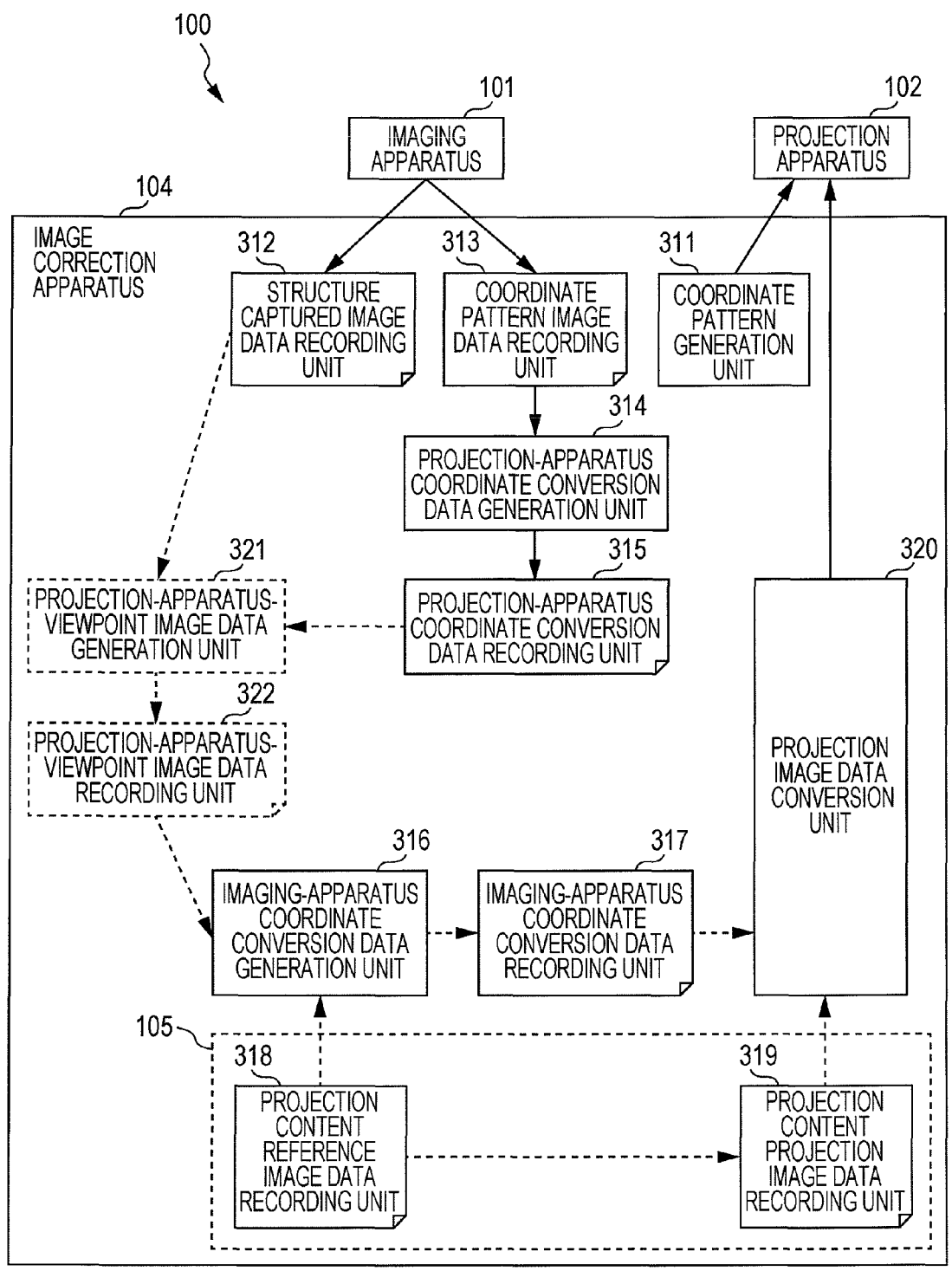
FIG. 9 is a functional block configuration diagram of an image correction apparatus according to a second exemplary embodiment.

FIG. 9 illustrates an example of the functional block configuration of the image correction apparatus 104 according to this embodiment. The image correction apparatus 104 according to this embodiment includes, in addition to the constituent elements of the image correction apparatus 104 according to the first embodiment, a projection-apparatus-viewpoint image data generation unit 321 and a projection-apparatus-viewpoint image data recording unit 322.

Figure 10:
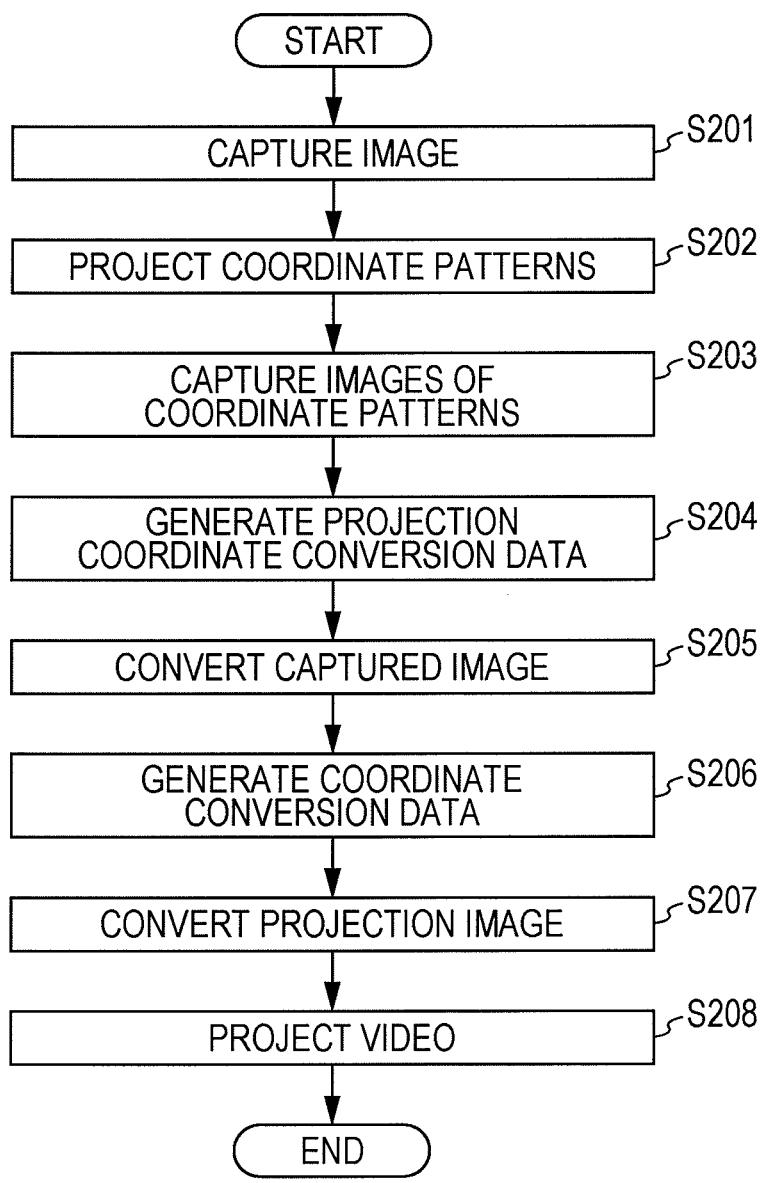
FIG. 10 is a flowchart of an image correction method according to the second exemplary embodiment.

FIG. 10 illustrates a flowchart of an image correction method according to this embodiment.

Step S201

The imaging apparatus 101 captures an image of the structure 103. The image correction apparatus 104 records the captured image of the structure 103 on the structure captured image data recording unit 312.

Step S202

Then, the projection apparatus 102 projects, onto an object, pattern light indicating a pattern image corresponding to information that indicates a coded projection coordinate. For example, as described above, a projection of the pattern light onto the structure 103 based on a pattern image of 1024×768 pixels using Manchester encoding requires pattern images of forty frames. The projection apparatus 102 sequentially projects forty pattern images generated by the coordinate pattern generation unit 311 onto the structure 103.

Step S203

The imaging apparatus 101 sequentially captures the pattern images projected onto the structure 103. Data of the pattern images is recorded on the coordinate pattern image data recording unit 313.

Step S204

First coordinate conversion information which associates imaging coordinates in the imaging apparatus 101 with projection coordinates in the projection apparatus 102 is obtained from the pattern images in the coordinate pattern image data recording unit 313.

Step S205

The projection-apparatus-viewpoint image data generation unit 321 reads a captured image of a structure from the structure captured image data recording unit 312, and reads the first coordinate conversion information to the captured image indicating the structure from the projection-apparatus coordinate conversion data recording unit 315. The projection-apparatus-viewpoint image data generation unit 321 performs a geometric transformation process using the first coordinate conversion information, which is obtained by the imaging apparatus, and generates a viewpoint-converted image as a by-product. The viewpoint-converted image refers to an image obtained from the viewpoint of the projection apparatus. The viewpoint-converted image is an image whose viewpoint has been converted to a viewpoint from the projection apparatus 102, and is an image that is worth being applied alone. The viewpoint-converted image is recorded on the projection-apparatus-viewpoint image data recording unit 322. In the manner described above, an image viewed from the viewpoint of the projection apparatus 102 can be generated using an image obtained by the imaging apparatus 101 installed at a position different from that of the projection apparatus 102.

The viewpoint-converted image is very effective to design video content for projection. For example, the viewpoint-converted image can be used as is for position alignment, and can thus be used for the correction of a projection image prepared in advance. Alternatively, the viewpoint-converted image can be used as a reference image to design new video content. In this embodiment, accordingly, the image correction apparatus 104 includes an output unit that outputs the viewpoint-converted image to outside. Examples of the output unit include a USB interface and a memory card interface. The image correction apparatus 104 is provided with a dedicated output terminal when implemented as a semiconductor integrated circuit. The configuration described above enables the viewpoint-converted image to be extracted to the outside.

Step S206

The imaging-apparatus coordinate conversion data generation unit 316 reads a reference image prepared in advance from the projection content reference image data recording unit 318, and reads a viewpoint-converted image from the projection-apparatus-viewpoint image data recording unit 322. The imaging-apparatus coordinate conversion data generation unit 316 compares the viewpoint-converted image with the reference image, and generates third coordinate conversion information. The third coordinate conversion information is information which associates the viewpoint-converted image with the reference image using a geometric transformation. The third coordinate conversion information is recorded on the imaging-apparatus coordinate conversion data recording unit 317.

Step S207

The projection image data conversion unit 320 performs a geometric transformation process on the projection image using the third coordinate conversion information, and generates a corrected projection image. The geometric transformation process described in the first embodiment can be used.

Step S208

The projection apparatus 102 projects the corrected projection image, which has been subjected to conversion by the projection image data conversion unit 320, onto the structure 103.

In the manner described above, video content can be projected onto the structure 103 by projection mapping in accordance with the flowchart illustrated in FIG. 10. In the method according to this embodiment, the steps may be reordered as long as there is no inconsistency between data dependencies. In addition, as an intermediate product of the image correction apparatus 104, a viewpoint-converted image free of pixel shift errors, as viewed from the viewpoint of the projection apparatus 102, may be generated using data of two or more imaging apparatuses at different viewpoints.

In this embodiment, a captured image which has been obtained by the imaging apparatus 101 is directly converted into an image in the projection coordinate system, enabling an improvement in the robustness of image matching to a projection image prepared for the projection apparatus 102. Since the conversion process is performed in a state where the position of the projection target is undefined, accuracy may deteriorate due to the influence of a portion other than the projection target, particularly, in the case of temporary degeneration into a transformation matrix or the like. Such deterioration can be avoided by recursive processing of both portions; however, it should be noted that the complexity of the processing may increase.

It is also possible to obtain a captured image in the projection coordinate system of the projection apparatus 102. This is very useful for a projection mapping content designer for the following reason. It is difficult to prepare an imaging apparatus 101 including an optical system having completely the same condition as that of the projection apparatus 102 and to capture an image from the same position as that of the projection apparatus 102.

Third Embodiment

The configuration, function, and operation of an image correction apparatus 104 according to this embodiment will be described with reference to FIGS. 11 and 12.

A projection system 100 according to this embodiment is different from the projection system 100 according to the first and second embodiments in that a projection image prepared in advance is selectively corrected in accordance with information on the distance to the structure 103. In the following, a description will focus on the difference from the projection system 100 according to the first and second embodiments.

Figure 11:
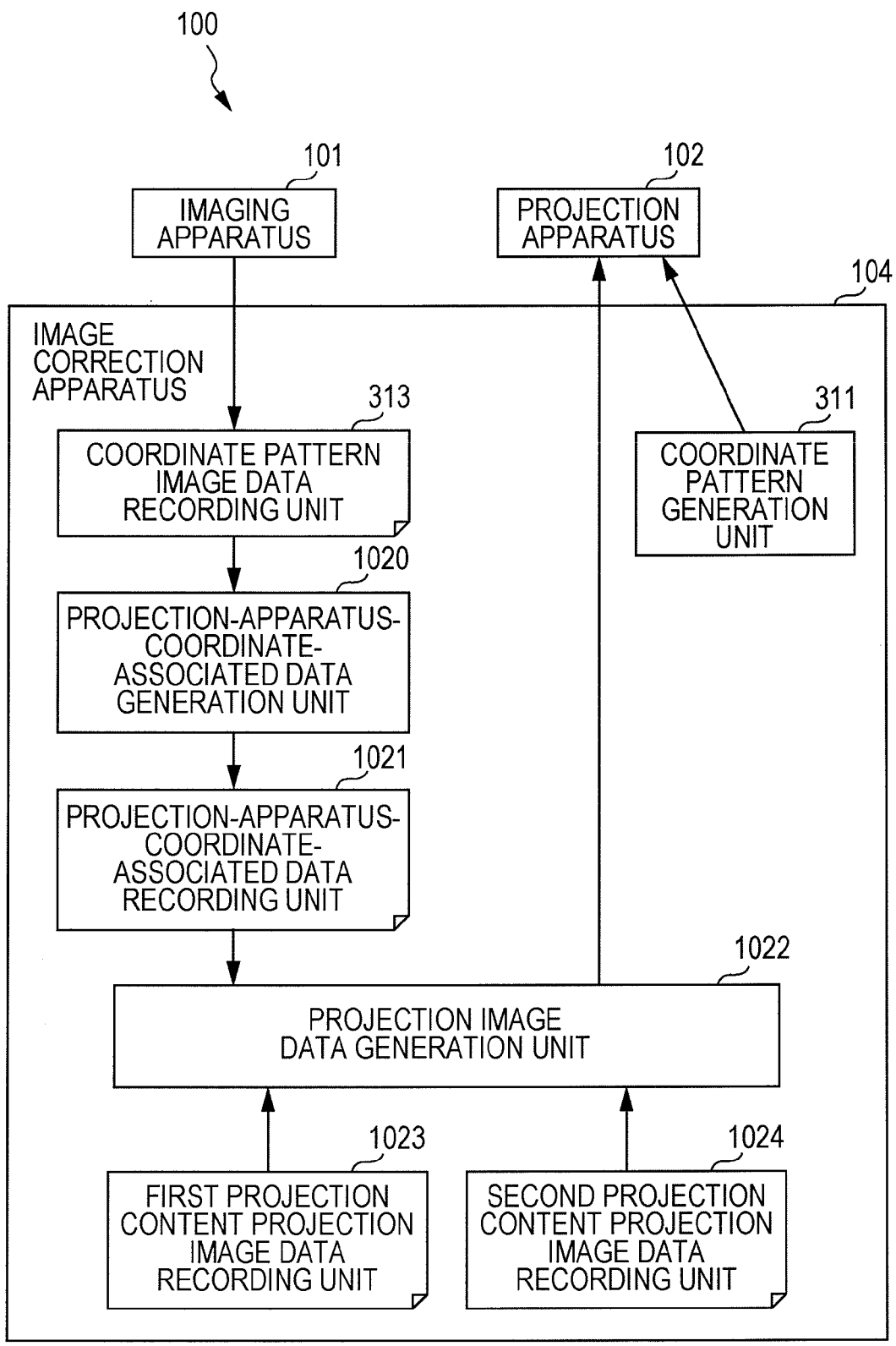
FIG. 11 is a functional block configuration diagram of an image correction apparatus according to a third exemplary embodiment.

FIG. 11 illustrates an example of the functional block configuration of the image correction apparatus 104 according to this embodiment. The image correction apparatus 104 according to this embodiment includes the coordinate pattern image data recording unit 313, the coordinate pattern generation unit 311, a projection-apparatus-coordinate-associated data generation unit 1020, a projection-apparatus-coordinate-associated data recording unit 1021, a projection image data generation unit 1022, a first projection content projection image data recording unit 1023, and a second projection content projection image data recording unit 1024.

Figure 12:
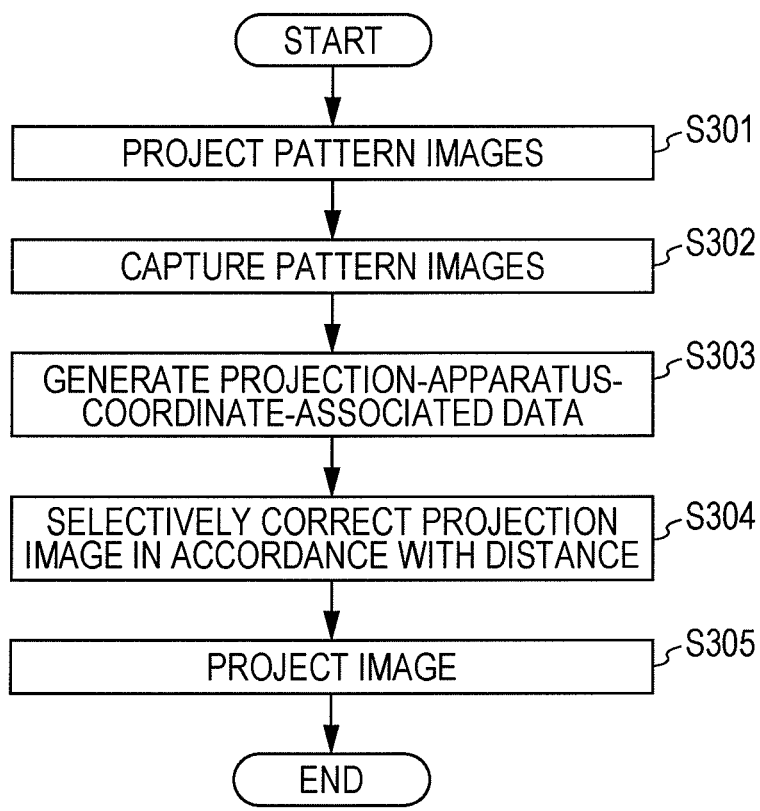
FIG. 12 is a flowchart of an image correction method according to the third exemplary embodiment.

FIG. 12 illustrates a flowchart of an image correction method according to this embodiment.

Step S301

The coordinate pattern generation unit 311 generates pattern images corresponding to information that indicates coded pixel coordinates in the projection apparatus 102. The projection apparatus 102 projects the pattern images onto the structure 103.

Step S302

The imaging apparatus 101 sequentially captures images of the structure 103 onto which the pattern images are projected, and records the images on the coordinate pattern image data recording unit 313.

Step S303

The projection-apparatus-coordinate-associated data generation unit 1020 writes the association (projection-apparatus-coordinate-associated data) between imaging coordinates in the imaging coordinate system of the imaging apparatus 101 and projection coordinates in the projection coordinate system of the projection apparatus 102 to the projection-apparatus-coordinate-associated data recording unit 1021.

The first projection content projection image data recording unit 1023 has recorded thereon in advance a first projection image corresponding to a first distance, and the second projection content projection image data recording unit 1024 has recorded thereon in advance a second projection image corresponding to a second distance different from the first distance. A plurality of projection images including third and fourth projection images, other than the first and second projection images, can be provided in accordance with the distances to the object.

Step S304

The projection image data generation unit 1022 selects one projection image from among the first projection image and the second projection image on the basis of the projection-apparatus-coordinate-associated data in the projection-apparatus-coordinate-associated data recording unit 1021 and the three-dimensional measurement information obtained from the imaging apparatus 101, and corrects the selected projection image. For example, the projection image data generation unit 1022 selectively switches the color or texture of the projection image to be projected onto the structure 103, in accordance with information on the distance to the structure 103. There are various conceivable methods for implementing the functions described above.

In a first method, the projection-apparatus-coordinate-associated data in the projection-apparatus-coordinate-associated data recording unit 1021 may be converted directly to a distance using trigonometry. The projection image data generation unit 1022 selects a projection image prepared in advance on the basis of information on the distance. For example, the projection image data generation unit 1022 generates a corrected projection image so that the first projection image is projected onto the background and the second projection image is projected onto an object within a given distance range.

This scheme enables measurement in the projection coordinate system of the projection apparatus 102, and can generate a corrected projection image without a pixel shift.

In a second method, the projection-apparatus-coordinate-associated data in the projection-apparatus-coordinate-associated data recording unit 1021 is converted to a distance using trigonometry. Thereafter, the distance is further converted to inclination information by differentiation so that information on the distance is converted to information on a normal vector to a surface of the structure 103. The first projection image and the second projection image are selectively determined on the basis of the direction of the normal vector.

For example, it is assumed that the structure 103 has a cubic shape. In this case, it is common to demand in projection mapping that different types of video content be projected onto surfaces of the cube.

This scheme enables measurement in the projection coordinate system of the projection apparatus 102, and can generate a corrected projection image without a pixel shift.

In a third method, a normal vector is determined by photometric stereo instead of using the projection-apparatus-coordinate-associated data in the projection-apparatus-coordinate-associated data recording unit 1021. Photometric stereo is a classical image processing technique. In this method, images captured from the subject that is irradiated by a light source in different directions are compared to estimate a normal vector to a surface of the subject. The light source may be implemented using a dedicated light source or a projection apparatus group including the projection apparatus 102. In particular, it is common in projection mapping to install a plurality of projection apparatuses 102. Thus, photometric stereo can be said to be a method that enables high-accuracy detection of a normal vector by software without any additional new light source.

In a fourth method, the imaging apparatus 101 includes a special sensor capable of performing 3D measurement simultaneously with capturing an image. For example, the sensor is a sensor capable of measuring a distance by a Time-of-Flight (TOF) scheme or the like. The use of such a sensor makes it possible to simultaneously perform distance measurement and video acquisition.

Distance measurement based on the TOF scheme refers to distance measurement in which the distance to an object is obtained from the velocity of light and a period of time until light emitted from a light source is reflected by an object and reaches the sensor.

This method enables measurement results of the special sensor to be converted to projection coordinates of the projection apparatus 102 for use. Some TOF schemes have strong capabilities in the measurement of a small-parallax area using trigonometry and others achieve a reduction in blind spots. Thus, the TOF scheme can be effective depending on the use condition.

Step S305

The projection apparatus 102 projects a corrected projection image onto the structure 103 in accordance with the distance to the structure 103.

This embodiment can provide a projection system which enables high-accuracy matching of video content to an object that is a projection target in accordance with the distance to the object.

According to the present disclosure, it is possible to modify video content for projection mapping, which is prepared beforehand, so that the position of the video content can be aligned with the position of the target structure automatically by a very simple operation and as intended, and the video content can be projected onto the target structure. This facilitates initial installation of a system and is useful for the automatic correction of a projection image in response to a change in the installation condition due to deterioration with time or external vibrations. In the manner described above, maintenance costs can be significantly reduced in a case where a facility for projection mapping is permanently installed.

In addition, in the field of product display and the like, there may be assumed a case where an object having a specific shape is mass-produced and the same projection mapping facility is installed in a plurality of stores. This means the mass production of a projection mapping facility. When unique video content is designed, the cost of designing the video content accounts for most of the costs, and thus the percentage of the calibration cost is low. However, the calibration cost is problematic for mass production and is not negligible. The present disclosure brings an effect of significantly reducing costs in the case described above.

There is also assumed a case where content for projection mapping with enhanced versatility in which projection targets, such as a corner of a room having a simple structure and a cube, are simplified will be sold as a download from a website in the future. In this case, it should be assumed that a user who lacks a full knowledge of projection mapping might install a system. In terms of this, a simple calibration technique as disclosed herein is also suitable for use in projection mapping.

The projection system, the semiconductor integrated circuit, and the image correction method as disclosed herein are applicable to a projection mapping system.

The invention claimed is:

1. A projection system comprising:
a projection apparatus that projects pattern light onto an object, the pattern light including pattern images corresponding to information that indicates coded projection coordinates in a projection coordinate system, the pattern images including a first pattern image and a second pattern image, the first pattern image including two or more continuous areas including a first continuous area having a first color and a second continuous area having a second color, the first continuous area touching the second continuous area, the second pattern image including two or more continuous areas including a third continuous area having the first color, a fourth continuous area having the second color, and a fifth continuous area having the first color, the fourth continuous area touching the third continuous area and the fifth continuous area, and a total number of the two or more continuous areas of the first pattern image being different from a total number of the two or more continuous areas of the second pattern image;
an imaging apparatus that captures images created on the object by projecting the pattern light projected onto the object and that generates captured images including imaging pixel values at imaging pixel coordinates in an imaging coordinate system; and
an image correction apparatus that generates, based on the captured images, coordinate conversion information which associates the projection coordinates with the imaging pixel coordinates and that corrects a projection image, which is prepared in advance, by using the coordinate conversion information,
wherein a width of the first continuous area, a width of the second continuous area, a width of the third continuous area, a width of the fourth continuous area, and a width of the fifth continuous area are identical,
wherein a length of the first continuous area is longer than a length of the third continuous area, and
wherein the length of the first continuous area is longer than a length of the fifth continuous area.

2. An image correction method comprising:
projecting pattern light onto an object, the pattern light including pattern images corresponding to information that indicates coded projection coordinates in a projection coordinate system, the pattern images including a first pattern image and a second pattern image, the first pattern image including two or more continuous areas including a first continuous area having a first color and a second continuous area having a second color, the first continuous area touching the second continuous area, the second pattern image including two or more continuous areas including a third continuous area having the first color, a fourth continuous area having the second color, and a fifth continuous area having the first color, the fourth continuous area touching the third continuous area and the fifth continuous area, and a total number of the two or more continuous areas of the first pattern image being different from a total number of the two or more continuous areas of the second pattern image;
capturing images created on the object by projecting the pattern light projected onto the object;
generating captured images including imaging pixel values at imaging pixel coordinates in an imaging coordinate system;
generating, based on the captured images, coordinate conversion information which associates the projection coordinates with the imaging pixel coordinates; and
correcting a projection image, which is prepared in advance, by using the coordinate conversion information,
wherein a width of the first continuous area, a width of the second continuous area, a width of the third continuous area, a width of the fourth continuous area, and a width of the fifth continuous area are identical,
wherein a length of the first continuous area is longer than a length of the third continuous area, and
wherein the length of the first continuous area is longer than a length of the fifth continuous area.

* * * * *